(12) United States Patent
Miura et al.

(10) Patent No.: US 6,375,357 B2
(45) Date of Patent: Apr. 23, 2002

(54) SPINDLE MOTOR

(75) Inventors: Kazushi Miura; Masato Gomyo; Takayuki Narita; Tokio Tago; Takehiko Yazawa, all of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/961,322

(22) Filed: Sep. 25, 2001

Related U.S. Application Data

(62) Division of application No. 09/549,698, filed on Apr. 1, 2001.

(30) Foreign Application Priority Data

Apr. 15, 1999 (JP) ............................................ 11-107724
Apr. 28, 1999 (JP) ............................................ 11-123056

(51) Int. Cl.[7] .............................................. F16C 32/06
(52) U.S. Cl. ........................ 384/100; 384/107; 384/112
(58) Field of Search ................................ 384/100, 107, 384/108, 109, 110, 111, 112, 113, 114, 115, 116, 118, 119, 120, 121, 123, 124; 360/99.28

(56) References Cited

U.S. PATENT DOCUMENTS

| | | | |
|---|---|---|---|
| 1,998,888 A | 4/1935 | Wallgren | 384/277 |
| 4,999,724 A | 3/1991 | McAllister et al. | 361/98.08 |
| 5,337,374 A | 8/1994 | Konishikawa | 384/107 |
| 5,683,183 A | * 11/1997 | Tanaka et al. | 384/100 |
| 5,743,655 A | * 4/1998 | Slavin et al. | 384/107 |
| 5,822,846 A | * 10/1998 | Moritan et al. | 384/120 |
| 5,844,748 A | 12/1998 | Dunfield et al. | 360/99.08 |
| 5,880,545 A | 3/1999 | Takemura et al. | 310/90 |
| 6,072,660 A | 6/2000 | Teshima | 360/99.08 |
| 6,144,523 A | * 11/2000 | Murthy et al. | 360/99.08 |
| 6,264,368 B1 | * 7/2001 | Tanaka et al. | 384/112 |

FOREIGN PATENT DOCUMENTS

JP  8-4769  1/1996

* cited by examiner

*Primary Examiner*—Thomas R. Hannon
(74) *Attorney, Agent, or Firm*—Sughrue Mion, PLLC

(57) ABSTRACT

A potential-difference alleviating member for alleviating and lowering the potential difference, which is an energy difference between a rotating or fixed bearing member and a rotary hub or a fixing frame which are formed of metals of different types, is interposed between the two members so as to prevent the occurrence or advance of potential difference corrosion. Relief portions are respectively provided at a joining interface between a rotary shaft and a thrust plate and a joining interface between a bearing member and the counter plate, and the respective members are welded in the relief portions so as to be integrated.

10 Claims, 6 Drawing Sheets

SPINDLE MOTOR

This is a divisional of application Ser. No. 09/549,698 filed Apr. 14, 2000, the disclosure of which is incorporated herein by reference.

BACKGROUND OF THE INVENTION

The present invention relates to a spindle motor used as an apparatus for rotatively driving a hard disk or the like.

A spindle motor disclosed in, for example, Japanese Patent Publication No. 8-4769A is known as a spindle motor used as apparatus for rotatively driving a recording medium such as a hard disk. As shown in FIG. 7, this spindle motor is mainly comprised of a stator assembly 100 and a rotor assembly 120 having driving magnets 125. The rotor assembly 120 has a hub 122 secured to an upper end portion of a rotary shaft 121 by means of press-fitting, shrinkage fitting, or the like. Meanwhile, the stator assembly 100 has stator cores 116 each formed by winding a coil 117 around a respective salient pole portion. These stator cores 116 are fitted to an outer peripheral portion of a bearing holder 115.

A bearing sleeve 113 is fitted in an inner peripheral portion of the bearing holder 115. Radial bearing portions RBa and RBb serving as bearing surfaces for generating hydrodynamic pressure are formed on an inner peripheral surface of the bearing sleeve 113 in such a manner as to be spaced apart from each other in the axial direction. A lubricating fluid 105 such as oil undergoes a pressure rise due to the pumping action of dynamic pressure generating grooves (not shown) when the rotary shaft 121 rotates, and the rotary shaft 121 and the hub 122 are pivotally supported by the hydrodynamic pressure generated by the lubricating fluid 105.

Further, a thrust plate 126 constituting a thrust hydrodynamic bearing portion is press-fitted and secured to the rotary shaft 121. Further, a counter plate 114 is fixed at an open end of the bearing holder 115 of a frame 111 through a mechanical coupling means such as fixing screws 106. The thrust plate 126 is placed between a lower end face of the bearing sleeve 113 and an inner bottom surface of the counter plate 114, and as the lubricating fluid 105 is present in this space, the rotary shaft 121 is stably supported in the thrust direction by the hydrodynamic pressure generated by the lubricating fluid 105.

In recent years, a trend toward compact and thin spindle motors for rotatively driving recording medium disks are rapidly underway. In conjunction with this trend, the bearing member (bearing sleeve 113) supporting the shaft 121 is formed of a metallic material different from the metallic material composing the fixing frame 111. One reason for this is that a metal excelling in workability is adopted as the metallic material composing the bearing sleeve 113 so that the inside-diameter portion of the bearing sleeve 113 can be machined satisfactorily. In this case, the bearing sleeve 113 formed of a different type of metallic material is integrally joined to the fixing frame 111 by means of press-fitting, shrinkage fitting or the like.

In a spindle motor in which different types of metallic material are integrally joined together, if an electrolyte having a large dielectric constant, such as water, penetrates the joint, a local battery is formed between these metallic materials of different types, and anodic dissolution occurs due to the local battery, resulting in the so-called potential difference corrosion. The portion where such potential difference corrosion occurs is scattered in due course of time in the form of dust, and causes damage to the recording medium disk or the magnetic head. Accordingly, in the case of an apparatus for which cleanliness is required, such as a hard disk drive (HDD), it is desirable to reliably prevent the occurrence of the aforementioned potential difference corrosion.

In recent years when motors are required to be thinner, it has become impossible to secure a sufficient joining length in the joining of the rotary shaft and the thrust plate and in the joining of the rotary shaft and the hub. Consequently, there have arisen problems in that it is difficult to obtain desired shock-resisting performance (e.g., 1,000 G or more) and joining strength capable of withstanding an external stress during assembly, thereby making it difficult to produce a thin motor.

For instance, in FIG. 7, various joining methods are adopted in joining the counter plate 114 and the frame 111 or in joining the counter plate 114 and the bearing sleeve 113. In a case where the fixing screws 106 shown in FIG. 7 are used to effect fastening, the heads of the fixing screws 106 hinder the attempt to produce a thin motor. In a case where the counter plate 114 is fixed by a calking method, the calked portion must be made to project from the bottom surface of the counter plate 114, which also hinders the attempt to produce a thin motor. Further, in a case where the counter plate 114 is fixed by a press-fitting method, since a sufficient joining length cannot be obtained, the joining strength lacks.

SUMMARY OF THE INVENTION

A primary object of the invention is to provide a spindle motor which makes it possible to prevent by a simple arrangement the potential difference corrosion between a bearing member and another member which are formed of metallic materials of different types.

A secondary object of the invention is to provide a spindle motor which can be made thin by increasing the joining strength even in the case of a part whose joining length is short.

In accordance with the invention, the arrangement is provided such that a potential-difference alleviating member for alleviating and lowering the potential difference, which is an energy difference between a rotating or fixed bearing member and a rotary hub or a fixing frame which are formed of metals of different types, is interposed between the two members so as to prevent the occurrence or advance of potential difference corrosion. Accordingly, the working environment of an apparatus such as a hard disk drive (HDD), in particular, for which cleanliness is required, can be made favorable, and the reliability of the apparatus can be improved.

Further, in accordance with the invention, the arrangement is provided such that an insulating resin coating film or a passivation film is interposed between a rotating or fixed bearing member and a rotary hub or a fixing frame which are formed of metals of different types, so as to prevent the occurrence of a local battery and prevent the occurrence or advance of potential difference corrosion. Accordingly, the working environment of an apparatus such as a hard disk drive (HDD), in particular, for which cleanliness is required, can be made favorable, and the reliability of the apparatus can be improved.

Furthermore, in accordance with the invention, the arrangement is provided such that relief portions are respectively provided at a joining interface between the rotary shaft and the thrust plate and a joining interface between the bearing member and the counter plate or a joining interface the fixing frame and the counter plate, and the respective members are welded in the relief portions so as to be integrated. Accordingly, even if the joining length of the members is relatively short, it is possible to obtain a sufficient joining strength and improve the shock resistance of the motor itself. As a result, the perpendicularity of the thrust plate with respect to the rotary shaft, for example, can be maintained stably, and the reliability of the motor can be improved.

DETAILED DESCRIPTION OF THE PREFERRED EMBODIMENTS

Figure 1:
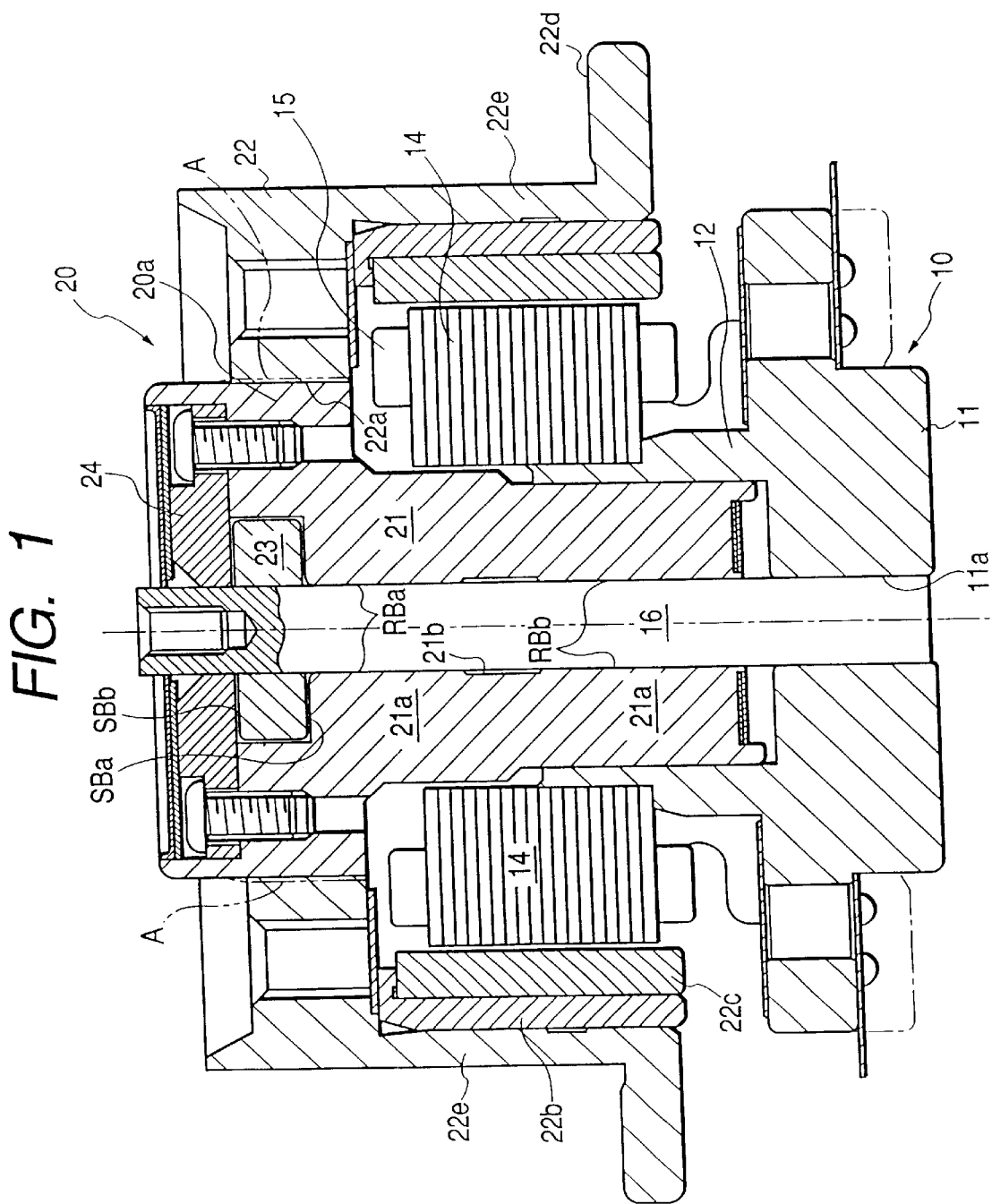
FIG. 1 is an explanatory cross-sectional view showing a hard-disk driving motor of a shaft fixed type according to a first embodiment of the present invention.

Hereafter, a description will be given of the embodiments of the invention. First, referring to the drawings, a description will be given of the structure of a hard disk drive (HDD) to which the invention is applied.

The HDD spindle motor of a shaft fixed type, which is a first embodiment of the present invention, shown in FIG. 1 is comprised of a stator assembly 10 serving as a fixed member and a rotor assembly 20 serving as a rotating member which is assembled to the stator assembly 10 from an upper side thereof in the drawing. Of these assemblies, the stator assembly 10 has a fixing frame 11 which is screwed down to an unillustrated fixed base. A hollow cylindrical bearing holder 12 is formed on a substantially central portion of the fixing frame 11 in such a manner as to be integrally provided uprightly, and stator cores 14 are fitted to an outer peripheral surface of the bearing holder 12. Driving coils 15 are respectively wound around salient pole portions of the stator cores 14.

A fixed shaft 16 formed of a stainless steel (SUS 420J2; indication based on JIS) is fixed in a shaft-fixing hole 11a of the fixing frame 11 in such a manner as to project upwardly. This fixed shaft 16 is disposed concentrically with the bearing holder 12, and an upper end portion of the fixed shaft 16 is also screwed down to the unillustrated fixed base. A bearing sleeve 21 serving as a rotating-shaft bearing member making up a part of the rotor assembly 20 is rotatably fitted on an outer periphery of the fixed shaft 16, and a rotary hub 22 for mounting an unillustrated recording medium such as a magnetic disk is joined to an outer periphery of the bearing sleeve 21.

A cylindrical large-diameter portion 20a for joining, which is formed in such a manner as to project outwardly in the radial direction, is disposed in an upper end portion of the bearing sleeve 21. A joining hole 22a, which is formed penetratingly in a central portion of the rotary hub 22, is integrally joined to an outer peripheral surface of the large-diameter portion 20a for joining by means of press-fitting or shrinkage fitting. The rotary hub 22 is formed of an aluminum group material for the purpose of light weight, and has a cylindrical body 22e. Annular driving magnets 22c are attached to an outer periphery of the cylindrical body 22e with a back yoke 22b placed therebetween. These magnets 22c are disposed in such a manner as to annularly oppose outer peripheral-side end faces of the stator cores 14 in close proximity thereto. Further, the cylindrical body 22e has a disk-mounting surface 22d for mounting the recording medium disk on its outer peripheral portion.

Meanwhile, the bearing sleeve 21 is formed of a copper group material or a stainless steel metal to facilitate drilling and the like. A pair of bearing projections 21a serving as a pair of radial bearings are formed on an inner periphery of a central hole, which is provided in the bearing sleeve 21, in such a manner as to be axially spaced apart a predetermined distance. Further, hydrodynamic surfaces formed on inner peripheral surfaces of these bearing projections 21a are disposed in such a manner as to proximately oppose hydrodynamic surfaces formed on an outer peripheral surface of the fixed shaft 16, thereby forming a pair of radial hydrodynamic bearing portions RBa and RBb which are adjacent to each other in the axial direction. More specifically, the hydrodynamic surface on the bearing sleeve 21 side and the hydrodynamic surface on the fixed shaft 16 side in each of the pair of radial hydrodynamic bearing portions RBa and RBb are opposingly disposed circumferentially with a very small gap of several microns therebetween. A lubricating fluid such as oil, a magnetic fluid, or air is charged in the bearing space having the very small gap in such a manner as to continue in the axial direction. It should be noted that oil is used as the lubricating fluid in this embodiment.

A fluid storage portion 21b, which is formed by radially recessing the inner peripheral portion of the central hole in the bearing sleeve 21, is formed between the pair of radial hydrodynamic bearing portions RBa and RBb, and a sufficient quantity of lubricating fluid is stored in the fluid storage portion 21b.

At least one of the hydrodynamic surfaces of the bearing sleeve 21 and the fixed shaft 16 is annually recessed to form unillustrated radial dynamic pressure generating grooves of, for example, herringbone shape in such a manner as to be axially divided into two blocks. Thus the lubricating fluid is pressurized by the pumping action of the radial dynamic pressure generating grooves during rotation to generate hydrodynamic pressure, and the rotary hub 22 is pivotally supported in the radial direction by the hydrodynamic pressure of the lubricating fluid.

In the axially opposite end portions of the bearing space which form the radial hydrodynamic bearing portions RBa and RBb, a pair of capillary seal portions are respectively disposed in such a manner as to axially sandwich the radial hydrodynamic bearing portions RBa and RBb. Each of these capillary seal portions is formed by gradually enlarging the gap between the bearing sleeve 21 and the fixed shaft 16 in the radially outward direction in a tapered manner by an inclined surface formed on the bearing sleeve 21. The dimension of the gap of the capillary seal portion disposed on the inward side of the bearing is set to a range of 20 $\mu$m to 300 $\mu$m, for example. These capillary seal portions are so arranged that the level of the lubricating fluid is located there when the motor either rotates or is at a standstill.

A disk-shaped thrust plate 23 is secured to an illustrated upper end portion of the fixed shaft 16. This thrust plate 23 is disposed so as to be accommodated in a hollow cylindrical recessed portion formed in a central portion of the upper end of the bearing sleeve 21. Axially proximately opposing surfaces of the thrust plate 23 and the bearing sleeve 21 in the recessed portion of the bearing sleeve 21 are formed as hydrodynamic surfaces, thereby forming a lower thrust hydrodynamic bearing portion SBa.

Further, a counter plate 24 formed of a large disk-shaped member is secured to the upper end portion of the bearing sleeve 21 so as to be located in close proximity to the illustrated upper hydrodynamic surface of the thrust plate 23. An upper thrust hydrodynamic bearing portion SBa is formed by the hydrodynamic surface provided on the lower surface of the counter plate 24 and the hydrodynamic surface of the thrust plate 23 side.

Both hydrodynamic surfaces on the thrust plate 23 side in the pair of thrust hydrodynamic bearing portions SBa and SBb which are disposed axially adjacent to each other, and both hydrodynamic surfaces on the bearing sleeve 21 and the counter plate 24 side which are respectively opposed thereto, are disposed in face-to-face relation to each other in the axial direction with very small gaps of several microns therebetween. The lubricating fluid such as oil, a magnetic fluid, or air is charged in the bearing spaces having the very small gaps in such a manner as to continue in the axial direction through outer peripheral-side passages in the thrust plate 23.

Further, at least one of the hydrodynamic surfaces of the thrust plate 23 on the one hand, and the hydrodynamic surfaces of the bearing sleeve 21 and the fixed shaft 16 on the other hand, is annularly recessed to form unillustrated thrust dynamic pressure generating grooves of, for example, herringbone shape in such a manner as to be radially divided into two blocks. Thus the lubricating fluid is pressurized by the pumping action of the thrust dynamic pressure generating grooves during rotation to generate hydrodynamic pressure, and the rotary hub 22 is pivotally supported in the thrust direction by the hydrodynamic pressure of the lubricating fluid.

Next, a description will be given of the technique of the invention for preventing the potential difference corrosion which can occur between the bearing member (bearing sleeve) and another member which are formed of metallic materials of different types.

As described above, the bearing sleeve 21 is formed of a copper group material, e.g., phosphor bronze which is one of copper alloys, while the rotary hub 22 which is integrally joined to the bearing sleeve 21 is formed of an aluminum group material, e.g., an aluminum material. These metals of different types are joined, thereby forming a one-piece rotating member. A potential-difference alleviating member A is interposed between the joined surfaces of the bearing sleeve 21 and the rotary hub 22. This potential-difference alleviating member A is formed of a metallic material, such as a nickel material, whose ionization tendency in the electrochemical series with respect to solution, e.g., plain water (tap water), is positioned between that of copper and that of aluminum. This potential-difference alleviating member A is formed on at least one of the joined surfaces of the bearing sleeve 21 and the rotary hub 22 in film form by plating processing, vapor deposition processing, or coating.

The ionization tendency refers to the tendency whereby a metal produces cations when coming into contact with a liquid, particularly water, and can be quantitatively evaluated by the standard electrode potential of the metal. The list of metals in which their ionization tendencies with respect to solution are arranged in the order of their magnitude is referred to as the electrochemical series.

In a case where the metallic materials of different types are copper and aluminum, metallic materials whose ionization tendencies in the electrochemical series with respect to plain water are positioned between that of copper and that of aluminum are Co, Mo, Cr, and Ni, while metallic materials whose ionization tendencies in the electrochemical series with respect to saline water are positioned therebetween are Fe, Sn, Co, W, Cr, Mo, and Ni. The ionization tendencies in the electrochemical series with respect to solution types are thus known. Accordingly, the material which is used as the potential-difference alleviating member A is selected on the basis of the aqueous solution which is considered to attach to the metals as well as the two metallic materials to be joined.

In the above-described embodiment, supposing that the potential-difference alleviating member A is not provided, since the rotating member is used in which the bearing sleeve 21 formed of a copper material and the rotary hub 22 formed of an aluminum material are joined, if an electrolyte having a large dielectric constant, such as water, penetrates the joint, a local battery is formed between the metallic materials of different types. Hence, anodic dissolution can possibly occur due to the local battery, resulting in potential difference corrosion. In contrast, in accordance with the invention, since the nickel film is provided as the potential-difference alleviating member A between the bearing sleeve 21 and the rotary hub 22, the potential difference between the two members 21 and 22 becomes small due to the potential-difference alleviating member A interposed between the two members 21 and 22, thereby making it possible to prevent the generation of the local battery and hamper the occurrence or advance of the potential difference corrosion. This action of preventing the potential difference corrosion is effective when one component part is formed by joining different types of metals as in the case of the bearing sleeve 21 and the rotary hub 22, and an energy difference (potential difference) occurs between the joined members.

As described above, the metal whose ionization tendency in the electrochemical series with respect to solution is positioned between those of two metals to be joined, i.e., the potential-difference alleviating member A, can be selected from among a number of materials. Hence, it suffices to select a material to be formed by taking into consideration a desired manufacturing method such as plating processing, vapor deposition processing, or coating. If the material is selected from this perspective, by merely adding such as a plating process to normal machining and assembling processes, it becomes possible to easily provide the potential-difference alleviating member A having a satisfactory function.

Although, in the first embodiment, a description has been given of a case in which a component part formed by joining metals of different types is formed by a copper material including a copper alloy and an aluminum material including an aluminum alloy, the selection of these metals of different types may be changed as required.

Figure 2:
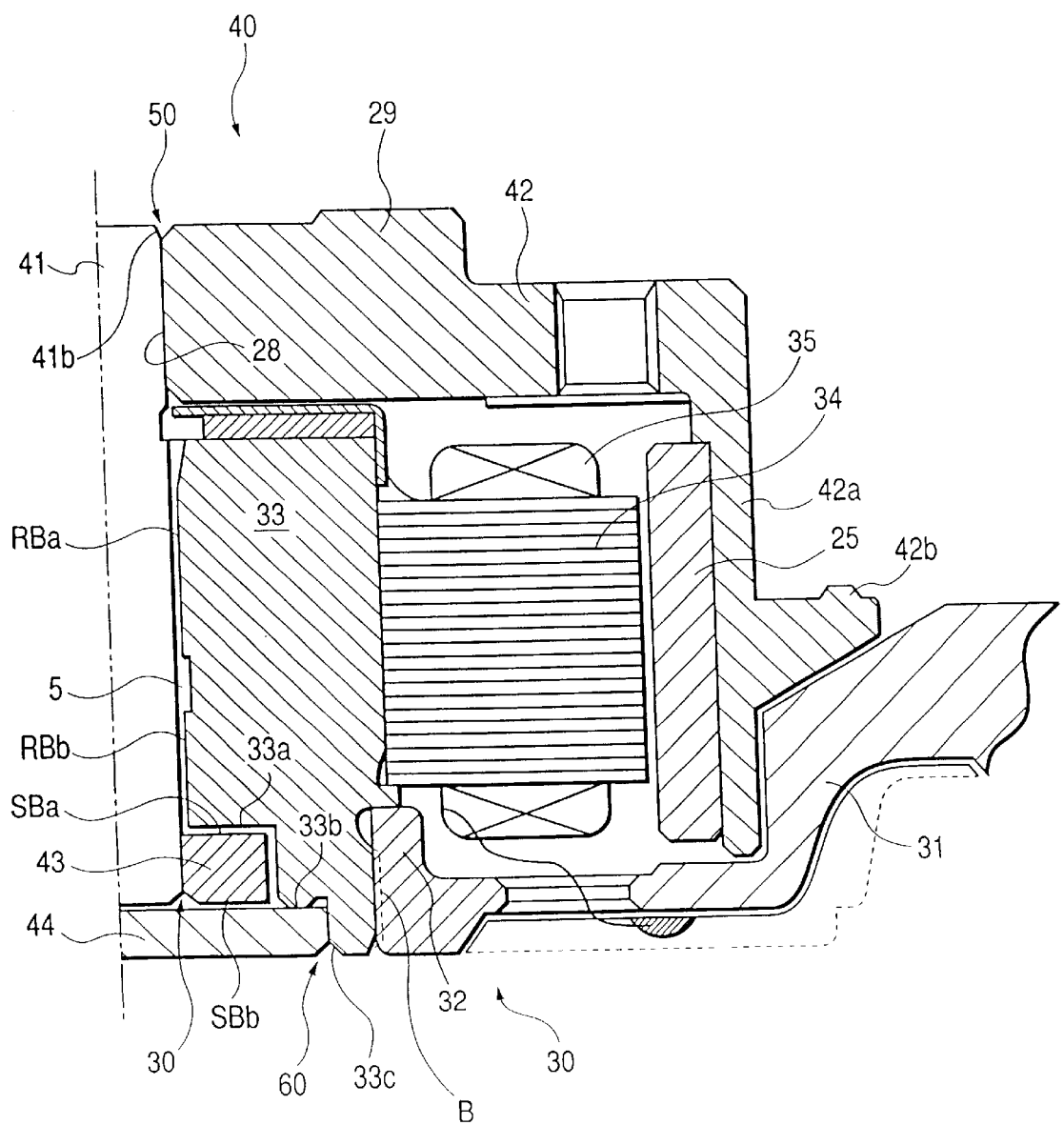
FIG. 2 is an explanatory half cross-sectional view showing a hard-disk driving motor of a shaft rotating type according to a second embodiment of the present invention.

Meanwhile, the invention is similarly applicable to a spindle motor of a shaft rotating type whose half cross sectional view is shown in FIG. 2, which is a second embodiment of the present invention.

The overall HDD spindle motor of the shaft rotating type shown in FIG. 2 is comprised of a stator assembly 30 serving as a fixed member and a rotor assembly 40 serving as a rotating member assembled to the stator assembly 30 from an upper side thereof in the drawing. Of these assemblies, the stator assembly 30 has a fixing frame 31 which is screwed down to an unillustrated fixed base. The fixing frame 31 is formed of an aluminum group material to attain light weight. A bearing sleeve 33 serving as a fixed bearing member formed in a hollow cylindrical shape is integrally joined to the inner side of an annular mounting portion 32, which is formed in such a manner as to be provided uprightly in a substantially central portion of the fixing frame 31, by press-fitting or shrinkage fitting.

The lower outer peripheral surface of the bearing sleeve 33 is formed such that its radial dimension substantially coincides with the radial dimension of the outer peripheral surface of the annular mounting portion 32. Stator cores 34 are fitted to an attaching surface formed by an outer peripheral surface of the bearing sleeve 33. Driving coils 35 are respectively wound around salient pole portions provided in the stator cores 34. In the embodiment shown FIG. 2, although the stator cores 34 are fitted to the attaching surface formed by the outer peripheral surface of the bearing sleeve 33, an arrangement may be provided such that the annular mounting portion 32 is extended upwardly, and the stator cores 34 are attached to an outer peripheral surface of that annular mounting portion 32.

A rotary shaft 41 formed of a stainless steel (SUS 420J2) or the like and making up a part of the rotor assembly 40 is rotatably inserted in a central hole provided in the bearing sleeve 33. Namely, hydrodynamic surfaces formed on the inner peripheral surface of the bearing sleeve 33 are disposed in such a manner as to proximately oppose hydrodynamic surfaces formed on the outer peripheral surface of the rotary shaft 41, thereby forming the pair of radial hydrodynamic bearing portions RBa and RBb which are adjacent to each other in the axial direction. The hydrodynamic surface on the bearing sleeve 33 side and the hydrodynamic surface on the rotary shaft 41 side in each of the pair of radial hydrodynamic bearing portions RBa and RBb are opposingly disposed circumferentially with a very small gap of several microns therebetween. A lubricating fluid such as oil, a magnetic fluid, or air can be used in the bearing space.

The bearing sleeve 33 is formed of a copper group material or a stainless steel to facilitate machining, and radial dynamic pressure generating grooves of, for example, herringbone shape are formed in its inner periphery in such a manner as to be axially divided into two blocks. Thus a rotary hub 42 together with the rotary shaft 41 is pivotally supported in the radial direction by the hydrodynamic pressure of the lubricating fluid during rotation.

The substantially cup-shaped hub 42 on which a recording medium such as a magnetic disk is mounted is secured to one end of the rotary shaft 41 by means of a joining member which will be described later. The hub 42 has a hollow cylindrical portion 42a to which the disk is fitted, as well as a disk mounting surface 42b which expands outwardly from the lower end of the hollow cylindrical portion 42a for mounting the disk thereon. Annular driving magnets 25 having magnetized poles are fitted to an inner peripheral surface of the hollow cylindrical portion 42a of the hub 42, and inner peripheral surfaces of the driving magnets 25 are opposed to outer peripheral surfaces of the stator cores 34 with an appropriate interval therebetween. Here, since the hub 42 is formed of a magnetic material such as iron, the hub 42 itself can be made to function as a back yoke for the driving magnets 25. Accordingly, in this embodiment, since the yoke which is a separate component is omitted, as compared with a hub 42 having an identical outside diameter and the yoke, the inner space of the hub 42, i.e., the space for disposing the armature, can be made large. Accordingly, it is possible to obtain a relatively large motor torque. It should be noted that in a case where the hub 42 is formed of a nonmagnetic material such as an aluminum alloy, a yoke formed of a magnetic material is interposed between the hub 42 and the driving magnets 25.

Meanwhile, a disk-shaped thrust plat 43 is secured to the other end side, i.e., on the lower side in the drawing, of the rotary shaft 41 by means of a joining member which will be described later. This thrust plate 43 is disposed so as to be accommodated in a recessed portion 33a formed in a central portion of the lower end side of the bearing sleeve 33. The upper thrust hydrodynamic bearing portion SBa is formed by hydrodynamic surfaces formed by axially proximately opposing end faces of the thrust plate 43 and the bearing sleeve 33 in the recessed portion 33a of the bearing sleeve 33.

Further, a disk-shaped counter plate 44 larger than the thrust plate 43 is secured in a lower end-side opening of the bearing sleeve 33 by a joining member, which will be described later, in such a manner as to be located in close proximity to the illustrated upper hydrodynamic surface of the thrust plate 43. Then, the lower thrust hydrodynamic bearing portion SBb is formed by the hydrodynamic surface provided on an upper end face of the counter plate 44 and the hydrodynamic surface on the thrust plate 44 side.

The hydrodynamic surfaces on the thrust plate 43 side in the pair of thrust hydrodynamic bearing portions SBa and SBb which are disposed axially adjacent to each other, and the hydrodynamic surfaces on the bearing sleeve 33 and the counter plate 44 side which are respectively opposed thereto, are disposed in face-to-face relation to each other in the axial direction with very small gaps of several microns therebetween. A lubricating fluid 5 is charged in the bearing spaces having the very small gaps in such a manner as to continue in the entire axial direction through outer peripheral-side passages in the thrust plate 43.

At least one of the hydrodynamic surfaces of the thrust plate 43 on the one hand, and the hydrodynamic surfaces of the bearing sleeve 33 and the counter plate 44 on the other hand, is annually recessed in the usual manner to form thrust dynamic pressure generating grooves of herringbone shape or spiral shape. Thus, when the thrust plate 43 is rotated in conjunction with the rotation of the rotor assembly 40, the rotor assembly 40 including the rotary shaft 41 and the hub 42 is pivotally supported in the thrust direction by the hydrodynamic pressure of the thrust dynamic pressure generating grooves.

As described above, the bearing sleeve 33 is formed of a copper group material, specifically phosphor bronze, to facilitate machining, while the fixing frame 31 which is integrally joined to the bearing sleeve 33 is formed of an aluminum group material, specifically an aluminum material. These metals of different types are joined. A potential-difference alleviating member B is interposed between the joined surfaces of the bearing sleeve 33 and the fixing frame 31. In the same way as in the already-described embodiment shown in FIG. 1, this potential-difference alleviating member B is formed of a metallic material, such as a nickel material, whose ionization tendency in the electrochemical series is positioned between that of a copper group material and that of an aluminum group material. This potential-difference alleviating member B can be formed by being coated on at least one of the joined surfaces of the bearing sleeve 33 and the fixing frame 31 in film form by plating processing, vapor deposition processing, or coating.

It should be noted that the potential-difference alleviating member B may be formed by a passivation film B coated on at least one of the joined surfaces of the bearing sleeve 33 and the fixing frame 31.

This passivation film B is an oxide film excelling in corrosion resistance, and can be obtained by subjecting the joined surface of the bearing sleeve 33 or the fixing frame 31 to electroless nickel-phosphor plating and by oxidizing and giving passivity to the plated film by being left to stand for a predetermined duration.

It should be note that, as for the passivation film B, the metallic material itself forming the bearing sleeve 33 or the fixing frame 31 may be used as the passivation film instead of using a plating material different from the metal to be joined. For example, an alumite film may be formed on the joined surface of the fixing frame 31 which is formed of an aluminum material and is joined to the bearing sleeve 33, and it is possible to prevent the formation of a local battery in the event that an electrolyte having a large dielectric constant, such as water, has penetrated the joined portions of the fixing frame 31 and the bearing sleeve 33.

In this embodiment as well, the energy difference between the bearing sleeve 33 and the fixing frame 31 in which metals of different types are joined, i.e., the potential difference between the two members 33 and 31, can be alleviated and lowered by the potential-difference alleviating member B interposed between the two members 33 and 31, thereby making it possible to prevent the occurrence or advance of potential difference corrosion.

Figure 3:
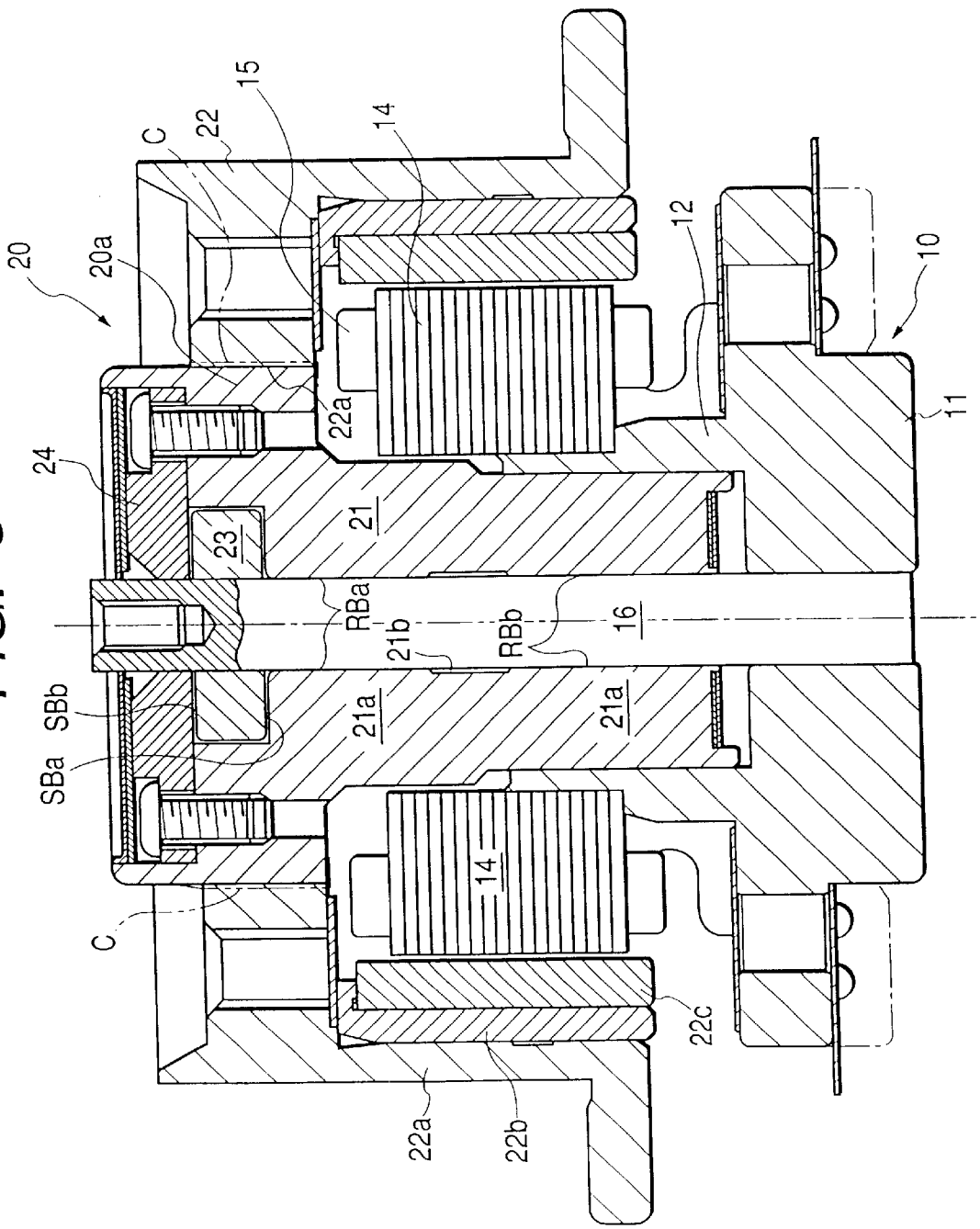
FIG. 3 is an explanatory cross-sectional view showing a hard-disk driving motor of a shaft fixed type according to a third embodiment of the present invention.

Next, in a third embodiment shown in FIG. 3, instead of the potential-difference alleviating member A in the first embodiment shown in FIG. 1, an insulating resin coating film C is interposed between the joined surfaces of the bearing sleeve 21 and the rotary hub 22. This resin coating film C is continuously formed over the entire circumferential periphery ranging from the inner joined portions of the bearing sleeve 21 and the rotary hub 22, to which water or the like is liable to be attached, to outer exposed surfaces of the bearing sleeve 21 on the upper and lower sides thereof in the drawing. In the inner joined portions of the bearing sleeve 21 and the rotary hub 22, a region is provided where the resin coating film C is not formed and is left in a notched state, so that the bearing sleeve 21 and the rotary hub 22 are made electrically conductive. Accordingly, the joined surfaces of the bearing sleeve 21 and the rotary hub 22 are made electrically conductive at the notched portion of the resin coating film C.

In the embodiment having the above-described configuration, since the bearing sleeve 21 and the rotary hub 22 formed of metals of different types are electrically insulated by the resin coating film C, even if waterdrops are attached, the local battery is not formed. Consequently, it is possible to prevent the occurrence or advance of potential difference corrosion. Since the attachment of the waterdrops cause a problem in the joined portions exposed to the outside, in this embodiment in which the resin coating film C is continuously formed up to the outer exposed surfaces of the bearing sleeve 21 extending continuously at the joined surfaces, the formation of the local battery can be prevented satisfactorily even if the electrolyte such as water is attached to the outer exposed surfaces of the joined surfaces.

The arrangement in which the potential-difference alleviating member or the passivation film is formed over the entire periphery up to the outer exposed surfaces of the bearing sleeve 21 extending continuously at the joined surfaces can be also applied to the embodiments already described.

In this embodiment, since the bearing sleeve 21 and the rotary hub 22 are electrically insulated by the resin coating film C, while inside part of the joined surfaces is made electrically conductive without the resin coating C, an arrangement can be provided to ground the rotary hub 22 through that conductive portion. Accordingly, even if static electricity has been generated in the rotary hub 22, discharging can be effected smoothly, so that damage or the like to the magnetic head due to the static electricity can be prevented.

Such a resin coating film C is similarly applicable to the spindle motor of the shaft rotating type shown in FIG. 2. If a similar resin coating film C is formed between the bearing sleeve 33 and the fixing frame 31, it is possible to obtain similar effect and advantages.

It should be noted that the invention can be similarly applied to any portion if it is a portion where metals of different types are joined. For example, in the embodiment shown in FIG. 2, a potential-difference alleviating member may be interposed between the joining portions of the rotary shaft 41 and the rotary hub 42.

Next, a description will be given of the technique of the invention for enhancing the joining strength of component parts even if joining length is small.

Figure 4A:
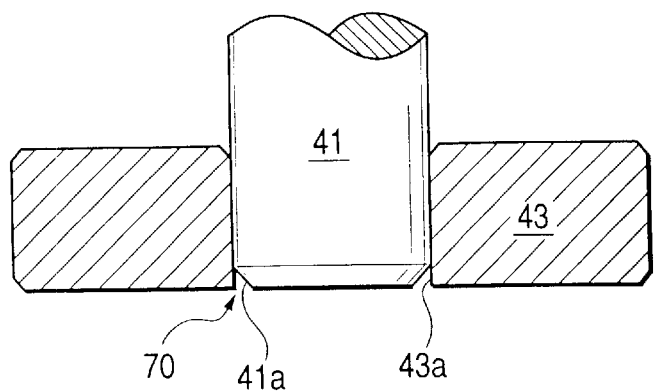
FIGS. 4A to 4C are cross-sectional views showing the structure for joining a rotary shaft and a thrust plate.
Figure 4B:
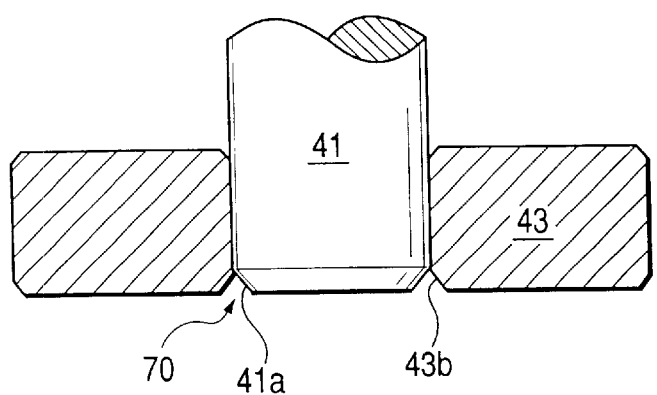
Figure 4C:
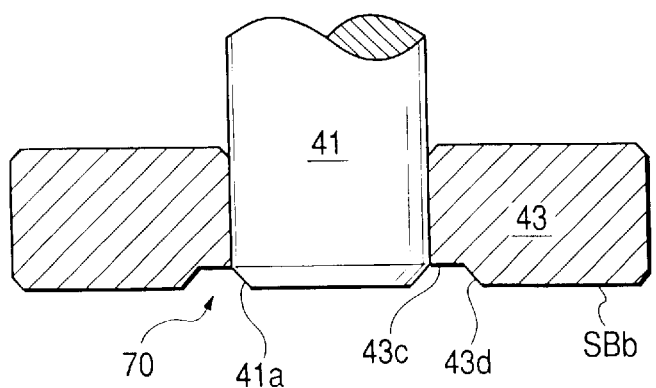

FIGS. 4A to 4C are diagrams explaining the structure for joining the rotary shaft 41 and the thrust plate 43 of the spindle motor in accordance with the second embodiment.

If the spindle motor is made thin and is designed to a height of, for example, 5 mm or thereabouts, the joining length of the rotary shaft 41 and the thrust plate 43 becomes less than 1 mm. Accordingly, the joining strength becomes weak since a sufficient joining length cannot be obtained even if the joining of the two members is effected by the press-fitting method or the shrinkage fitting method. If press-fitting is effected by providing a large press-fitting allowance, there is a possibility of deterioration of the perpendicularity of the thrust plate 43 with respect to the rotary shaft 41, so that a press-fitting allowance of more than a predetermined amount cannot be provided. Accordingly, in this embodiment, after the rotary shaft 41 and the thrust plate 43 are press-fitted or inserted by an appropriate press-fitting force to such an extent that the deterioration of perpendicularity does not occur, the joining interface portions of the two members are welded together. At this juncture, an axially recessed relief portion 70 is annularly formed in advance at the surface portion of the joining interface portion, and the rotary shaft 41 and the thrust plate 43 are welded in this relief portion 70.

The shape of the relief portion 70 at the joining interface between the rotary shaft 41 and the thrust plate 43 is formed in one of the shapes shown in FIGS. 4A, 4B, and 4C. Namely, in FIG. 4A, a tapered surface 41a is formed over the entire periphery around the outer peripheral edge of a tip of the rotary shaft 41, while an inner peripheral surface 43a of a central hole of the thrust plate 43 is adjacent to the tapered surface 41a. Accordingly, the relief portion 70 of a wedge-shaped cross section is formed, and the two members are welded in this relief portion 70. It should be noted that the tapered surface 41a at the tip of the rotary shaft 41 also functions as a guide portion at the time the thrust plate 43 is press-fitted to the rotary shaft 41.

FIG. 4B shows an example in which the tapered surface 41a is formed over the entire periphery around the outer peripheral edge of the tip of the rotary shaft 41, while a tapered surface 43b is also formed around the inner peripheral edge of the central hole of the thrust plate 43. The two members are welded together in this relief portion 70.

In FIG. 4C, the tapered surface 41a is formed over the entire periphery around the outer peripheral edge of the tip of the rotary shaft 41, while a flat recess 43c is formed around the central hole at a bottom surface portion of the thrust plate 43, a tapered surface 43d being formed around its outer periphery. Further, the hydrodynamic surface SBb is formed on its outer side. In the case of this example, a trapezoidal relief portion 70 is formed, and the two members are welded together in this relief portion 70.

Each of the relief portions 30 formed at the joining interface between the rotary shaft 41 and the thrust plate 43 is formed at a position offset from the region where the dynamic pressure generating grooves are formed in the thrust plate 43. Accordingly, the dynamic pressure generating grooves are not subjected to limitations by the relief portion 70, and it is possible to allow desired thrust hydrodynamic pressure to be demonstrated.

Further, as for the welding position, the entire periphery may be welded, or welding may be effected partially at a plurality of locations, insofar as the welding position or positions are located in the relief portion 70.

As the welding process, it is possible to adopt a plasma welding process, an arc welding process such as TIG welding, an electron beam welding process typified by laser welding, or the like. In this embodiment, the laser welding process is adopted in which the basic materials to be joined are welded together by fusing the two materials. In this laser welding process, a laser beam emitted from a laser oscillator is focused by using a plurality of mirrors, and is radiated to the joining interface to join the two members. According to such an electron beam welding process, since a welding rod used in the arc welding process is made unnecessary, the buildup of the basic material in the joined interface portions can be minimized. Further, even if a slight buildup has occurred, since the axially recessed relief portion 70 is provided at the joining interface, the built-up portion is accommodated in the relief portion 70, and can be prevented from projecting from the hydrodynamic surface toward the counter plate 44 side (see FIG. 2). Accordingly, it is desirable to set the size of the relief portion 70 by taking the size of the built-up portion into consideration.

If the arrangement is provided such that the built-up portion is accommodated in the relief portion 70, the built-up portion is prevented from being located excessively close to the counter plate 44, and when the rotor assembly 40 including the thrust plate 43 is rotated, it is possible to prevent the built-up portion from colliding against the bearing surface of the counter plate 44. Further, although the joined portions of the rotary shaft 41 and the thrust plate 43 are located in the lubricating fluid 5, since the two members are joined by welding without using an organic solvent such as an adhesive agent, the catalytic action with respect to the lubricating fluid 5 does not occur, so that the characteristics of the lubricating fluid 5 such as oil do not deteriorate.

Next, a description will be given of the structure for joining the bearing sleeve 33 and the counter plate 44 of the spindle motor shown in FIG. 2.

The disk-shaped counter plate 44 is secured in the opening at the lower end of the bearing sleeve 33 formed in a hollow cylindrical shape. The counter plate 44 has its outer peripheral surface press-fitted to the bearing sleeve 33 with an appropriate press-fitting force, and an outer peripheral edge of its upper end face abuts against a stepped portion 33b of the bearing sleeve 33. Further, an axially recessed relief portion 60 is formed in the portions of the obverse (lower) sides of the joining interface portions of the bearing sleeve 33 and the counter plate 44, and the two members are integrated by welding in the relief portion 60. As the welding process, in the same way as the above-described process of joining the rotary shaft 41 and the thrust plate 43, it is possible to use an electron beam welding process typified by laser welding. Accordingly, at least one of the bearing sleeve 33 and the counter plate 44 is fused by being irradiated with an electron beam, thereby joining the two members.

Further, the shape of the relief portion 60 may be wedge-shaped, triangular, trapezoidal, or other cross-sectional shapes in the same way as the shape of the stepped surface of the relief portion 70 formed at the joining interface between the rotary shaft 41 and the thrust plate 43 shown in FIGS. 4A to 4C. It should be noted that a tapered guide portion 33c should preferably be formed at an inner peripheral edge of the opening of the bearing sleeve 33 so as to facilitate the press-fitting or insertion of the counter plate 44. Further, as for the welding position, it is preferable to weld the entire periphery so as to seal the opening.

In the structure for joining the bearing sleeve 33 and the counter plate 44, the relief portion 60 is provided which is capable of accommodating the built-up portion formed by joining the joining interface portions, and welding is effected in this relief portion 60 to integrate the two members, as described above. Therefore, even if the built-up portion is formed by joining, the attempt to make the overall motor thin is not hampered. Furthermore, since the bearing sleeve 33 and the counter plate 44 are joined by welding, it is possible to reliably prevent the leakage of the lubricating fluid 5 without using an O-ring or an adhesive agent.

Next, a detailed description will be given of the structure for joining the rotary shaft 41 and the hub 42 of the spindle motor in accordance with this embodiment. As shown in FIG. 2, the joining length of the rotary shaft 41 and the hub 42 is longer than the joining length of the rotary shaft 41 and the thrust plate 43, but if the overall height of the motor is shortened, the joining length of the rotary shaft 41 and the hub 42 also inevitably becomes short. Consequently, the joining strength of the rotary shaft 41 and the hub 42 declines. Accordingly, in this embodiment, in the same way as the structure for joining the rotary shaft 41 and the thrust plate 43, the two members are joined by welding after the rotary shaft 41 and the hub 42 are press-fitted with an appropriate press-fitting force.

Here, if press-fitting is effected by providing a large press-fitting allowance of the hub 42 with respect to the rotary shaft 41, distortion occurs in the hub 42 due to the press-fitting stress. Consequently, the perpendicularity of the hub 42 with respect to the rotary shaft 41, specifically the perpendicularity of the disk-mounting surface 42b of the hub 42 with respect to the rotary shaft 41, becomes deteriorated, so that the problem of occurrence of runout exceeding an allowable range is liable to occur when the disk is mounted on the hub 41 and is rotatively driven.

Accordingly, in this embodiment, an axially recessed relief portion 50 is formed at the joining interface between the rotary shaft 41 and the hub 42, and the two members are joined by laser welding in this relief portion 50. The relief portion 50 is formed by a tapered surface 41b formed at a corner of the tip of the rotary shaft 41 and a tapered surface 42c formed at an inner peripheral edge of a shaft-attaching hole 28 of the hub 42. Of these tapered surfaces, the tapered surface 41b of the rotary shaft 41 also functions are a guide portion at the time of press-fitting the hub 42 to the rotary shaft 41. It should be noted that, in this embodiment, since a clamper guide 29 for guiding a clamper (not shown) for holding the disk is provided on an upper end face of the hub 42 in such a manner as to axially project slightly from the joining interface between the rotary shaft 41 and the hub 42, the attempt to make the motor thin is not hampered even if the relief portion 50 is not formed. Further, as for the welding position, the entire periphery of the joining interface may be welded, or welding may be effected partially at a plurality of locations.

By virtue of the above-described joining structure, since the joining strength of the rotary shaft 41 and the hub 42 can be sufficiently increased without forcibly press-fitting the rotary shaft 41 and the hub 42, the shock resistance of the motor improves, and the perpendicularity of the disk mounting surface 42b of the hub 42 with respect to the rotary shaft 41 can be maintained with high accuracy.

Figure 5:
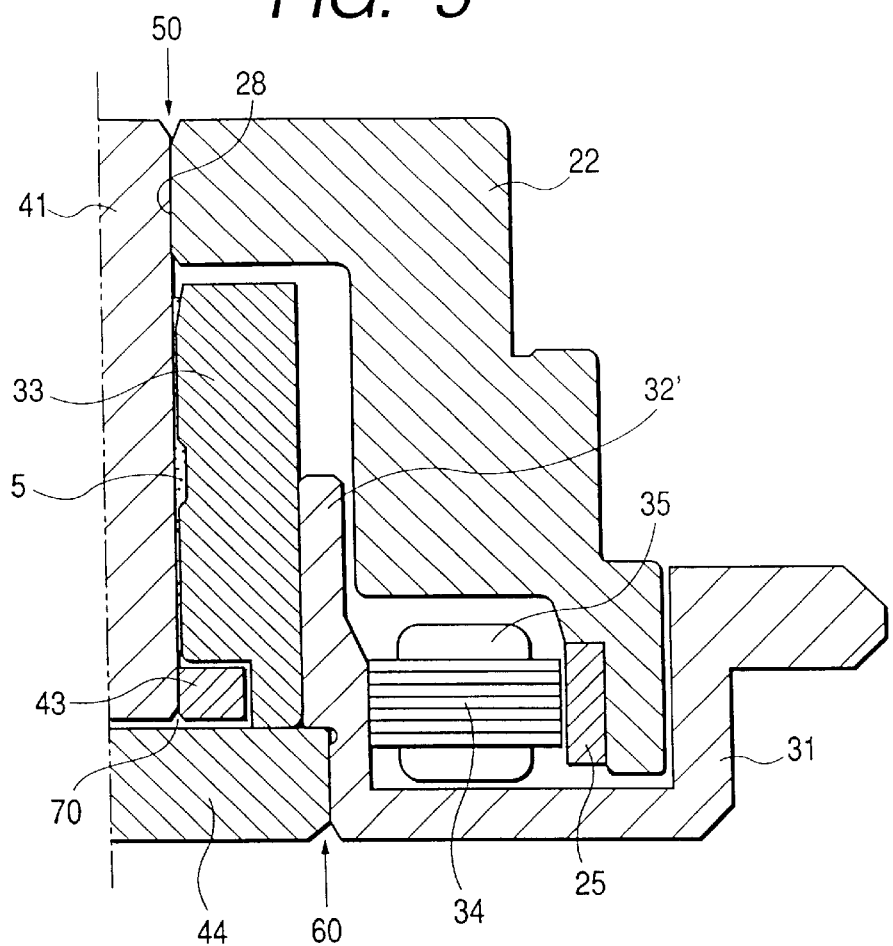
FIG. 5 is a half cross-sectional view showing a spindle motor according to a fourth embodiment of the present invention.

FIG. 5 is a half cross-sectional view showing a spindle motor in accordance with a fourth embodiment of the invention. In FIG. 5 those arrangements having common functions to those of the spindle motor shown in FIG. 2 are denoted by the same reference numerals, and a detailed description thereof will be omitted.

The stator cores 34 each having the coil 35 wound therearound are attached to the outer periphery of a tubular holder 32' provided uprightly in the center of the fixing frame 31. This tubular holder 32' is formed to be axially longer than the tubular holder 32 shown in FIG. 2, and the bearing sleeve 33 and the counter plate 44 are fixed to its inner periphery. Namely, although the counter plate 44 in FIG. 2 is joined to the opening of the bearing sleeve 33, in FIG. 5, the counter plate 44 is joined to the opening of the tubular holder 32' of the fixing frame 31 after being pressfitted thereto with an appropriate press-fitting force.

In joining the counter plate 44 to the tubular holder 32', the axially recessed relief portion 60 is provided at the joining interface between the two members, and the counter plate 44 and the tubular holder 32' are welded in this relief portion 60 to integrate the two members. As the welding process, the arc welding process or the electron beam welding process is adopted as described above. Preferably, however, at least one of the counter plate 44 and the tubular holder 32' is fused by the electron beam welding process typified by laser welding so as to join the two members. By joining the two members in the relief portion 60 in this manner, since a portion projecting from the bottom surface of the fixing frame 31 or the counter plate 44 is not formed, the attempt to make the motor thin is not hampered. Further, since the fixed shaft 31 and the counter plate 44 are firmly joined by welding, the shock resistance also improves.

In this embodiment as well, the rotary shaft 41 and the thrust plate 43 are joined in the same way as in the above-described embodiments. Namely, one end of the rotary shaft 41 is press-fitted in the central hole of the thrust plate 43, the relief portion 70 is formed at the joining interface between the rotary shaft 41 and the thrust plate 43, and the two members are integrated by welding in the relief portion 70.

Further, in the joining of the rotary shaft 41 and the hub 42, in the same way as the joining of the rotary shaft 41 and the thrust plate 43, the rotary shaft 41 is press-fitted in the central hole of the hub 42, the relief portion 50 is formed at the joining interface between the rotary shaft 41 and the hub 42, and the two members are integrated by welding in the relief portion 50. Incidentally, this relief portion 50 may be omitted depending on the shape of the hub 42.

As described above, in accordance with the spindle motor shown in FIG. 5 as well, it is possible to obtain a sufficient joining strength even if the joining length of the rotary shaft 41 and the thrust plate 43 and the joining length of the tubular holder 32' of the fixing frame 31 and the counter plate 44 are relatively short. Accordingly, it is possible to stably maintain the perpendicularity of the thrust plate 43 with respect to the rotary shaft 41. Moreover, even if projections are formed by welding, since the projections are respectively accommodated in the relief portions 60 and 70, the attempt to make the overall motor thin is not hampered. Further, since the rotary shaft 41 and the thrust plate 43 are joined by welding, even if the lubricating fluid 5 is oil, catalytic action does not occur, and the characteristics of the lubricating fluid 5 do not deteriorate.

Figure 6:
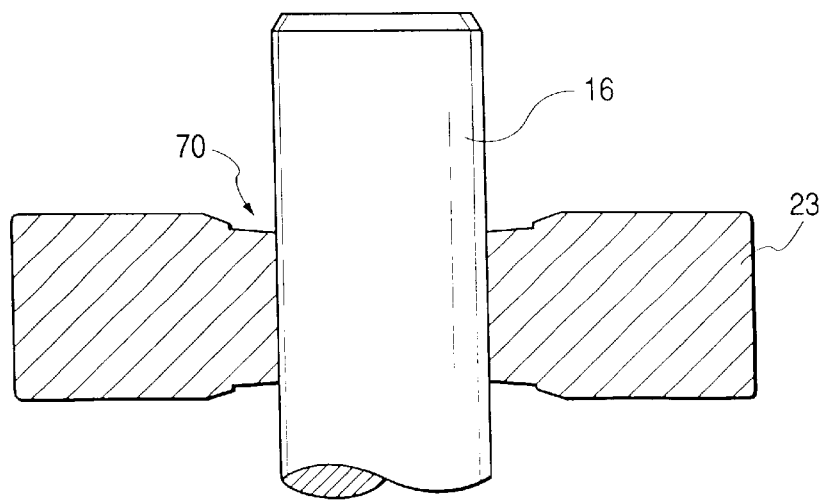
FIG. 6 is a cross-sectional view showing the structure for joining the fixed shaft and the thrust plate shown in FIG. 1.
Figure 7:
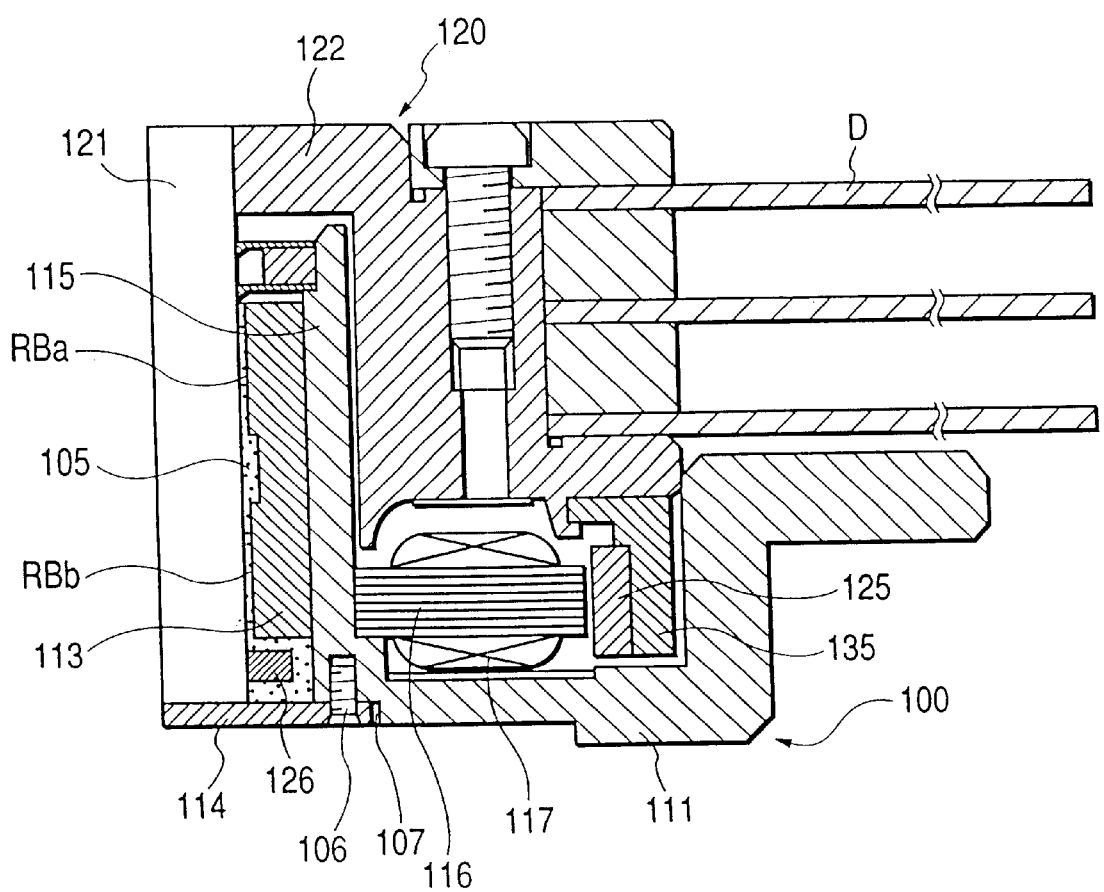
FIG. 7 is a half cross-sectional view showing a related spindle motor.

Next, a description will be given of the structure for joining the fixed shaft 16 and the thrust plate 23 in FIG. 1. After the bearing sleeve 21 formed integrally with the hub 22 is fitted over the fixed shaft 16 provided uprightly on the fixing frame 11, the annular thrust plate 23 is press-fitted to the fixed shaft 16 with an appropriate press-fitting force. Subsequently, as the joining interface portions of the fixed shaft 16 and the thrust plate 23 are welded together, the two members are joined. As shown in FIG. 6, the relief portion 70 which is recessed below the hydrodynamic surface is annularly formed at the peripheral edge of the central hole corresponding to the joining interface portion on the thrust plate 23 side. The laser welding process is desirable as this welding, and the thrust plate 23 formed of a copper group material, a stainless steel metal, or the like is fused so as to undergo metallic fusion with the fixed shaft 16. The welding with the fixed shaft 16 is performed in the relief portion 70, and the arrangement provided is such that even if a local projection occurs due to welding, it does not project above the hydrodynamic surface.

By virtue of such an arrangement, since a sufficient joining strength can be obtained even if the joining length of the fixed shaft 16 and the thrust plate 23 is relatively short, the perpendicularity of the thrust plate 23 with respect to the fixed shaft 16 can be maintained stably, so that the reliability of the motor improves. Moreover, since the axially recessed relief portion 70 is provided at the joining interface, and the two members are integrated by welding in this relief portion 70, the attempt to make the overall motor thin is not hampered. Further, since the joining interface portions located in such a manner as to be contiguous to the lubricating fluid 5 for generating hydrodynamic pressure are welded, even if the lubricating fluid 5 is oil, catalytic action does not occur, and the characteristics of the lubricating fluid 5 do not deteriorate.

Although a description has been given above specifically of the embodiments of the invention devised by the present inventors, the invention is not limited by the foregoing embodiments, and it goes without saying that various modifications are possible without departing from the scope of the invention.

For example, although, in the above-described embodiment, an example has been shown in which joining is accomplished by welding in such a way that the counter plate 44 closes the bearing sleeve 33 or the opening of the tubular holder 32' of the fixing frame 31, part of the joining interface may be welded to secure joining strength, and the entire periphery of the joining interface may be sealed by an adhesive agent. Consequently, it is possible to reliably prevent the leakage of the lubricating fluid.

Furthermore, the invention is similarly applicable to a spindle motor than a hard-disk driving motor, e.g., a CD-ROM driving motor and a polygon-mirror driving motor.

What is claimed is:

1. A spindle motor comprising:

a fixed frame having a cylindrical holder;

a cylindrical bearing sleeve having a hydrodynamic bearing surface on an inner peripheral face thereof, and disposed in the cylindrical holder;

a rotary shaft rotatably supported on an inner peripheral face of the fixed bearing sleeve via a lubricating fluid provided therebetween;

a rotary hub secured to a first end of the rotary shaft;

an annular thrust plate integrally joined to a second end of the rotary shaft to constitute a thrust hydrodynamic bearing portion in the bearing sleeve;

a disk-like counter plate for closing an opened end portion of the bearing sleeve in which the thrust hydrodynamic bearing portion is provided; and a relief portion formed on one end portion of joining surfaces of the rotary shaft and the thrust plate so as to recess in an axial direction of the rotary shaft at which the rotary shaft and the thrust plate are welded to be integrated with each other.

2. The spindle motor as set forth in claim 1, further comprising:

a relief portion formed on one end portion of joining surfaces of the counter plate and the bearing sleeve so as to recess in an axial direction of the rotary shaft at which the counter plate and the bearing sleeve are welded to be integrated with each other.

3. The spindle motor as set forth in claim 2, wherein at least one of materials constituting the joining surfaces is fused to be joined to the other material.

4. The spindle motor as set forth in claim 1, further comprising:

a relief portion formed on one end portion of the rotary surfaces of the counter plate and the cylindrical holder of the fixed plate so as to recess in an axial direction of the rotary shaft at which the counter plate and the cylindrical holder are welded to be integrated with each other.

5. The spindle motor as set forth in claim 4, wherein at least one of materials constituting the joining surfaces is fused to be joined to the other material.

6. The spindle motor as set forth in claim 1, wherein the rotary hub and the rotary shaft are secured to each other by welding.

7. The spindle motor as set forth in claim 1, wherein dynamic pressure generating grooves are formed in the thrust hydrodynamic bearing portion; and wherein the relief portion is located where it is away from a portion where the dynamic pressure generating grooves are formed.

8. A spindle motor comprising:

a fixed shaft;

a cylindrical rotary bearing sleeve rotatably supported on an outer peripheral face of the fixed shaft via a lubricating fluid provided therebetween;

a rotary hub integrally joined to the rotary bearing member;

a fixed frame having an opening into which a first end of the fixed shaft is secured;

an annular thrust plate integrally joined to a second end of the fixed shaft to constitute a thrust hydrodynamic bearing portion in the bearing sleeve; and a relief portion formed on one end portion of joining surfaces of the fixed shaft and the thrust plate so as to recess in an axial direction of the fixed shaft at which the fixed shaft and the thrust plate are welded to be integrated with each other.

9. The spindle motor as set forth in claim 8, wherein dynamic pressure generating grooves are formed in the thrust hydrodynamic bearing portion; and wherein the relief portion is located where it is away from a portion where the dynamic pressure generating grooves are formed.

10. The spindle motor as set forth in claim 8, wherein at least one of materials constituting the joining surfaces is fused to be joined to the other basic material.

* * * * *